United States Patent Office 3,243,257
Patented Mar. 29, 1966

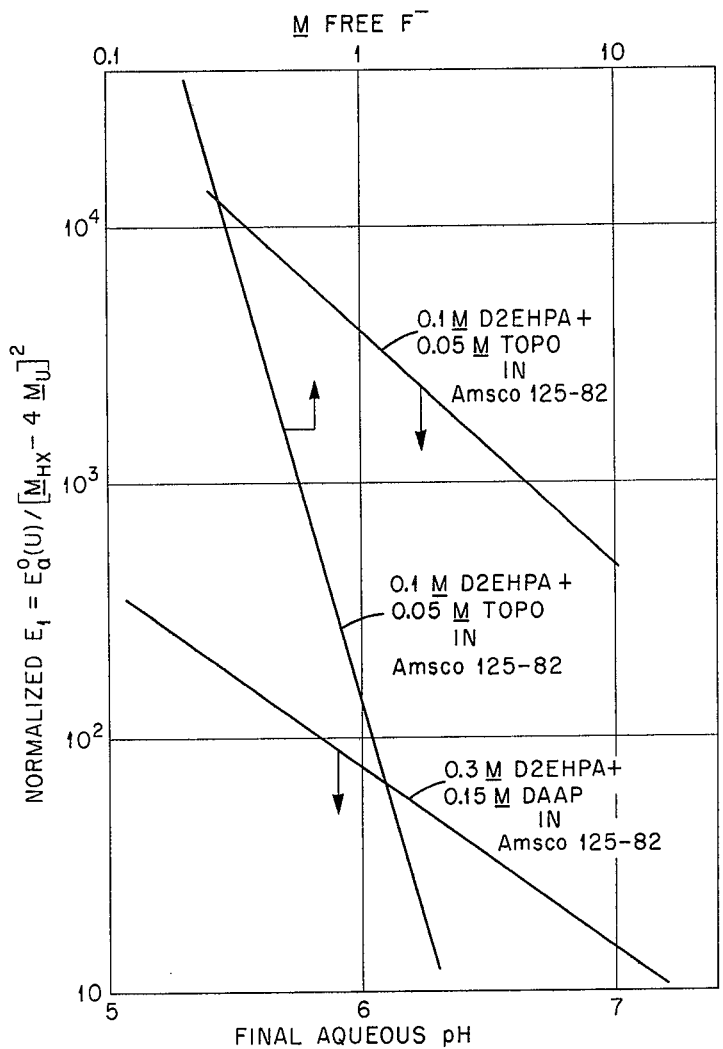
INVENTOR.
Charles F. Coleman

3,243,257
RECOVERY OF URANIUM AND ZIRCONIUM
FROM AQUEOUS FLUORIDE SOLUTIONS
Charles F. Coleman, Oak Ridge, Tenn., assignor to the United States of America as represented by the United States Atomic Energy Commission
Filed Sept. 11, 1963, Ser. No. 308,294
8 Claims. (Cl. 23—14.5)

The present invention relates to a method of recovering uranium and/or zirconium from zirconium-uranium compositions. More particularly, this invention relates to an improved solvent extraction process for the separation and recovery of uranium or zirconium from aqueous fluoride solutions.

A major area of utility of this invention lies in the processing of neutron-irradiated and non-irradiated nuclear fuel element compositions containing uranium and zirconium. In such compositions, the uranium may exist as the element, as a compound, or as an alloy with zirconium or other metal. After neutron irradiation, it is frequently economically desirable to recover the remaining uranium for reuse, especially if it is enriched in its uranium-235 content. Such recovery involves the separation of the uranium from all structural materials contained in the fuel element, including zirconium, and from all fission products produced by the irradiation, including fission-product zirconium. The wastes containing these fission products require, because of health and safety standards, that extensive precautionary measures be taken to contain them. In addition, the original fabrication of such fuel elements results in the production of a fairly large amount of machining filings and other machining residues, as well as a relatively large number of fabricated elements rejected as unfit for use in a reactor. The aggregate material from these several and other sources represents a considerable inventory of two highly expensive metals uncontaminated with fission products, and their separate recovery and purification from such sources is also economically warranted, especially so, if the uranium is enriched in its uranium-235 content. The recovery of these valuable elements would be reflected in a reduced cost of the total nuclear fuel cycle of an operating nuclear power plant. It is, therefore, a general purpose of this invention to provide a process for the efficient, economic separation and recovery of uranium and/or zirconium from compositions containing both elements, and particularly from nuclear fuel compositions. A specific object of this invention is to provide an improved solvent extraction process for the recovery and separation of uranium and/or zirconium values from aqueous fluoride solutions containing said values. With this general purpose and specific object in mind, the present invention stated in its broadest form is an improved process for effecting selective solvent extraction of uranium from aqueous fluoride solutions containing uranium and zirconium by contacting said solutions at a pH preferably in the range 5 to 7 at a free fluoride concentration of no greater than about one molar with a mixture comprised of a substantially water-immiscible diluent, a dialkylphosphoric acid having the formula:

$$R_2O-\underset{\underset{OH}{|}}{\overset{\overset{OR_1}{|}}{P}}=O$$

where $R_1$ and $R_2$ represent alkyl radicals, the total number of carbon atoms in said dialkylphosphoric acid being at least ten, and a minor proportion of a neutral organophosphorus compound selected from the group consisting of

and

where $R_3$, $R_4$, and $R_5$ are selected from the group consisting of alkyl and alkoxy radicals and alkyl and alkoxy radicals having at least one substituent selected from the group consisting of hydroxyl and chloro, and $R_6$, $R_7$, and $R_8$ represent alkoxy radicals, the total number of carbon atoms in said neutral organophosphorus compound being at least ten, whereby uranium values are transferred to the organic phase, and separating the resulting uranium.

In order to practice this invention, an aqueous fluoride solution containing dissolved uranium and zirconium values is required. The simultaneous dissolution of uranium and zirconium can be effected by contacting a zirconium-uranium composition with at least a 4 molar aqueous solution of ammonium fluoride at a temperature of up to about 100° C., adding a peroxide, in incremental amounts, to the heated solution throughout the period of dissolution until all of the uranium has been converted to a soluble uranyl salt. This process of dissolution to form a solvent extraction feed solution required for the present invention is described more fully in U.S. Patent 2,992,886, of common assignee.

In order to appreciate the advantages of the present invention, it is of interest to compare it with prior art processes for doing the same thing. Effective simultaneous dissolution of uranium and zirconium by aqueous solutions of ammonium fluoride requires the use of excess amounts of free fluoride ions in solution where the free fluoride ion content is equal to the difference of total fluoride ion content minus an amount equivalent to six times the zirconium content. It should be noted that it is now technically feasible to separate uranium values selectively from aqueous fluoride solutions containing excess amounts of free fluoride ions. This can be accomplished by the method described in the aforesaid U.S. patent in which the excess free fluoride ions in solution are complexed into an essentially non-ionic form and a sufficient amount of a salting agent is introduced into the solution, as a metal nitrate, to promote selective uranium extraction through the common ion effect. Both of these requirements are met by the addition of aluminum nitrate plus nitric acid to the uranium-zirconium containing fluoride solution. The disadvantage of this prior process lies in the need to use large quantities of acidic aluminum nitrate for the aforementioned purposes because, among other reasons its use constitutes an increased direct cost in the recovery process. Further, its presence increases the bulk of fission product-containing wastes and hence increases the capacity required of containment facilities for those wastes, and its presence greatly aggravates the corrosive properties of the wastes and hence requires use of expensive corrosion-resistant materials in construction of the containment facilities; both of these requirements contribute markedly to the unit cost of uranium recovery from neutron-irradiated fuel elements. Moreover, in the case of treatment of non-irradiated compositions where recovery of the zirconium may also be desired, the use of aluminum nitrate results in admixture of aluminum with the zirconium; separation of such aluminum constitutes an additional cost and may preclude economic recovery of the zirconium. These disadvantages are effectively ameliorated in the present invention because, in my process, efficient solvent extraction can take place from an essentially neutral solution without the need for either a fluoride complexing agent or a salting-out agent. Thus, a direct cost for such agents is avoided. The waste requiring containment is kept at a minimum of bulk so that the cost of containment facilities is minimized. Its corrosiveness is slight, so that containment may be achieved in facilities constructed of materials that are cheaper but less corrosion-resistant than is usual. Or, alternatively, containment in facilities constructed of the usual corrosion-resistant materials can tolerate more extreme storage conditions than are usual, e.g., higher internal temperature, with concomitant decrease in operating cost. In the case of treatment of non-irradiated compositions, since little or no extraneous cations are added to the aqueous feed, the resulting aqueous uranium-depleted raffinate may now be used as a source of essentially pure zirconium, thus allowing not only separation but recovery of both valuable constituents of the composition being treated.

In order to carry out solvent extraction by the process of this invention, a stable aqueous feed solution containing dissolved zirconium and uranium values is prepared as previously described. The process parameters which determine efficient uranium separation as measured by the uranium extraction coefficient, equilibration time and ease of separation of the aqueous and organic phases, are the pH of the feed solution and the concentration of free fluoride ions in the aqueous phase, as well as the choice of the selected organic extractant.

The organic extractant which is useful in the present invention is a mixture of a dialkylphosphoric acid having the formula:

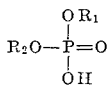

where $R_1$ and $R_2$ represent alkyl radicals, the total number of carbon atoms in said dialkylphosphoric acid being at least ten, and a minor proportion of a neutral organophosphorus compound selected from the group consisting of

and

where $R_3$, $R_4$ and $R_5$ are selected from the group consisting of alkyl and alkoxy radicals and alkyl and alkoxy radicals having at least one substituent selected from the group consisting of hydroxyl and chloro, and $R_6$, $R_7$ and $R_8$ represent alkoxy radicals, the total number of carbon atoms in said neutral organophosphorus compound being at least ten, whereby uranium values are transferred to the organic phase, and separating the resulting uranium. This mixture is dissolved in an organic diluent in order to adjust the density and viscosity of the organic phase to achieve ready physical separation from the aqueous phase. Among the diluents which are suitable include the aliphatic hydrocarbons, aromatic hydrocarbons, aromatic petroleum fractions, and chlorinated hydrocarbons. Because of its low cost and desirable physical properties, I prefer to use kerosene as a diluent. In the examples included here to illustrate the invention the extracting agent comprises a mixture of di(2-ethylhexyl)-phosphoric acid plus trioctylphosphine oxide dissolved in Amsco-125–82 in one case and a mixture of di(2-ethylhexyl)phosphoric acid plus diamyl amylphosphonate in Amsco-125–82 in the second case. Amsco-125–82 is a kerosene containing hydrocarbons in the $C_{12}$ to $C_{14}$ range.

Efficient solvent extraction occurs in this invention at a pH in the range 5 to 7. This is an essentially neutral solution and may be employed in a system comprised of mild steel, or stainless steel with corrosion rates significantly lower than in the processing of acid fluoride solutions in stainless steel, while the resulting radioactive waste, wherever produced, may be stored in tanks of mild steel, concrete, or stainless steel. It should be noted here that the process is applicable to solutions at an acid pH appreciably lower than 5; this invention obviates the need for operating at extreme acidities and thus avoids the extreme corrosion problems normally encountered with aqueous highly acidic feeds. In general in acidic aqueous feeds, the uranium extraction coefficient normally decreases with a decrease in pH of the feed. On the other hand, in accordance with this invention the uranium extraction coefficient increases with a decrease in pH of 7 down to 5 or less. A pH of higher than about 7 may not, in some cases, be tolerated since it sometimes leads to adverse precipitation of dissolved metal values. The curves of the accompanying figure show the effect of the equilibrium pH of the aqueous phase on the uranium extraction coefficient $E_a^o$, plotted as normalized extraction coefficients $E_1$ defined by $$E_1 = E_a^o(U)/[HX] - 4[U]^2 \qquad (1)$$

wherein [U] is the molar concentration of uranium in the organic phase.

The uranium coefficient $$E_a^o\ (U) = \frac{[U]}{[U]\ (\text{aq.})} \text{ (at equilibrium)} \qquad (1a)$$

The extraction of uranium by a dialkyl phosphoric acid may be written as:

$$UO_2^{++} + 2(HX)_2 \rightleftharpoons UO_2X_4H_2 + 2H^+ \qquad (2)$$

where X is the alkylphosphate anion. From (2) it is clear that the total amount of uncombined extractant $$[HX]_{\text{uncombined}} = [HX]_{\text{total}} - 4[U] \qquad (2a)$$

By the mass action law the equilibrium quotient for (2) is $$Q = \frac{[H^+]^2[UO_2X_4H_2]\text{org.}}{[HX]^2[UO_2]\text{aq.}} \qquad (3)$$

Combining (1a) and (3) and rearranging terms we have $$E_a^o(U) = \frac{[HX]^2 Q}{[H^+]^2} \qquad (4)$$

Thus when $E_a^o(U)$ has been measured at one total extractant concentration (A), its value can be calculated at any other total extractant concentration (B)

$$\frac{E_a^o(U)_A}{E_a^o(U)_B} = \frac{([HX]_A - 4[U])_A^2}{([HX]_B - 4[U])_B^2} \qquad (5)$$

At $[HX]_B = 1$ and defining $E_a^o(U)_1 = E_1$ we have $$E_1 = E_a^o(U)/([HX] - 4[U])^2 \qquad (1)$$

Equation 4 shows that in acid systems the uranium extraction coefficient increases with increasing pH. However, as shown by the curves in the accompanying figure, the reverse effect is found in the nearly-neutral fluoride solutions.

As previously noted, effective simultaneous dissolution of uranium and zirconium values requires an excess of free fluoride ions. After dissolution, the presence of an excess of free fluoride ions has an adverse effect on the uranium extraction coefficient. The curves on the graph of the accompanying figure also show the extreme dependence of the uranium extraction coefficient on the free fluoride concentration in the aqueous phase. In the present invention, the concentration of ionic or "free" fluoride may be lowered by simple dilution with water.

To conduct solvent extraction of the uranium from the aqueous feed on a practicable large scale, it is preferred that a continuous countercurrent system be used, although the invention is technically feasible under a batch or a semi-continuous operation. In a continuous countercurrent system, the aqueous feed is passed downwardly through a contactor, typically in a column in countercurrent contact with a rising stream of an organic phase containing a selective uranium extractant as defined and having a specific gravity sufficiently distinct from the aqueous phase to allow ready separation of the two phases. The rising organic phase becomes continuously enriched in uranium as it reaches the feed point of the aqueous phase. Scrubbing of the uranium-enriched organic phase at a point past the aqueous feed point with a dilute aqueous solution of ammonium fluoride or ammonium bifluoride increases the uranium decontamination by an order of magnitude relative to that achieved during extraction. The uranium-loaded, scrubbed extract is then transferred to a stripping zone which is typically a column in which said extract is passed upwardly in countercurrent contact with a stripping solution which strips the uranium from the organic phase. Among the stripping reagents which may be used for this purpose include: (1) Carbonate, which may be suitably furnished as ammonium or sodium carbonate or bicarbonate, (2) hydroxide, which may be suitably furnished as sodium or ammonium hydroxide, (3) magnesium oxide, which reacts with aqueous solution to form hydroxide, and (4) stripping with acids under some conditions, and in the presence of some reagents, is possible when using high acid concentrations, but acid stripping generally is not practicable under usual process conditions. The choice of stripping agent will depend on the final form of recovered uranium desired by those practicing this invention. For example, a stripping solution of dilute ammonium carbonate results in a solution of ammonium uranyl tricarbonate $(NH_4)_4UO_2(CO_3)_3$ which may be concentrated to solid form and then decomposed or calcined to a uranium oxide product.

In the case of treatment of non-irradiated compositions, the aqueous raffinate contains substantially all the zirconium content of the initial feed solution uncontaminated with large quantities of salting-out reagents or other extraneous cations or anions normally used to enhance the efficiency of solvent extraction. The zirconium values in said aqueous raffinate may be recovered by evaporation or precipitation to produce a solid fluozirconate or hydrous zirconia.

Having described the invention in general terms, the following examples will further illustrate and define the operational parameters involved in effecting efficient uranium extraction. In the description and examples, the source feed solution was prepared by dissolving a zirconium-uranium alloy in an aqueous ammonium fluoride solution at a temperature about 100° C. while continuously adding hydrogen peroxide to the solution. After effecting total dissolution of the zirconium and uranium, the final solution, hereinafter referred to as Z solution, had the following composition:

|        | G./liter | M     |
|--------|----------|-------|
| U      | 0.95     | 0.004 |
| Zr     | 31       | 0.34  |
| F      | 51       | 2.7   |
| $NH_4$ | 27       | 1.5   |

The pH was 6-7 and the peroxide concentration was <0.001 M.

*Example 1*

A volume of Z solution was shaken with an equal volume of an organic phase having the composition described in Table I for a period of 30 minutes, after which the organic and aqueous phases were separated and analyzed for their zirconium and uranium content. The results are summarized in Table I below.

TABLE I

[Phase ratio 1:1, 30 minutes agitation]

| Extractant [1] | Feed | $E_a^o(U)$ | $E_a^o(Zr)$ |
|---|---|---|---|
| 0.1 M D2EHPA+0.05 M TOPO in Amsco-125-82 | Z | 2.5 | <0.0001 |
| 0.1 M D2EHPA in Amsco-125-82 | Z | [2]<0.1 | |
| 0.3 M TOPO in Amsco-125-82 | Z | 0.003 | <0.0001 |
| | Z+0.3 M Acetic Acid | 0.004 | <0.0001 |
| | Z+0.3 M $NaNO_3$ | 2 | <0.0001 |
| | Z+0.3 M $HNO_3$ | 2 | <0.0001 |
| | Z+1 M $HNO_3$ | 10 | <0.0001 |

[1] D2EHPA=Di(2-ethylhexyl)phosphoric acid. TOPO=Tri-n-octylphosphine oxide.
[2] Estimated value.

It will be seen that while TOPO extracted uranium with extraction coefficients greater than unity only in the presence of added nitrate, D2EHPA in a synergistic combination with TOPO gave a uranium extraction coefficient greater than unity without any nitrate being present.

In further tests with 0.1 M D2EHPA+0.05 M TOPO in Amsco-125-82, the measured values of the uranium extraction coefficient $E_a^o(U)$ and the zirconium extraction coefficient $E_a^o(Zr)$ at contact times ranging from 30 seconds to 30 minutes were relatively constant, indicating a relatively rapid rate of equilibration of the zirconium and uranium metal values between the two phases.

Scrubbing of the uranium-coating extract was effected with an ammonium fluoride solution in one case and ammonium bifluoride solution in another. The results of the scrubbing tests are summarized in Table II below.

TABLE II

*Fluoride scrubbing of D2EHPA extract*

[0.1 M D2EHPA-0.05 M TOPO in Amsco-125-82 used to extract uranium from Z feed, then subdivided for parallel scrubbing tests. Phase ratios 1:1]

| Aqueous Phase | Free F, M | $E_a^o(U)$ |
|---|---|---|
| Z Feed | [1]0.7 | 2.3 |
| $NH_4HF_2$ Scrub | 0.2 | 330 |
| | 2 | 0.2 |
| | 12 | <0.01 |
| $NH_4F$ Scrub | 0.2 | 330 |
| | 2 | <0.01 |
| | 12 | <0.01 |

[1] Estimated free fluoride in feed, on basis of 6 F bound per Zr.

It will be seen that the results with 0.2 molar fluoride supplied as fluoride or bifluoride were identical. However, at 2 M fluoride ion the fluoride depressed uranium extraction considerably more than did the bifluoride. The effect of fluoride ion on the U extraction coefficient was illustrated in another way by comparing the extraction coefficients achieved when using the free acid form of the dialkyl phosphoric acid extractant with those achieved when using the ammonium form of the acid. Table III below summarizes the results of this line of experimentation.

TABLE III

D2EHPA *extraction*

[ Comparison of extractant forms, synergistic additives, and feed dilutions 5 ml. extractant vs. 5 ml. Z feed+dilution water as indicated]

| | $E_a^o$ (U) | | | |
|---|---|---|---|---|
| Extractant form | $NH_4X$ | HX | HX | HX |
| Feed | Z | Z | Z+40% water | Z+100% water |
| 0.1 M D2EHPA+0.05 M TOPO | [1] 0.7 (0.7) | 3.5 (0.7) | 20 (0.5) | 70 (0.35) |
| 0.3 M D2EHPA+0.15 M DAAP [2] | 0.2 (0.7) | 0.8 (0.7) | 4 (0.5) | 28 (0.35) |

[1] Values in parentheses are the free fluoride molar concentration.
[2] DAAP=diamyl amylphosphonate.

It should be noted that the adverse effect of the fluoride ion can be simply and easily overcome by dilution of the feed with water to decrease the free fluoride molarity in order to raise the uranium extraction coefficient by a significant factor. The effect of the free fluoride concentration (indicated in the parentheses in Table III) on the uranium extraction coefficient before and after dilution is clearly shown by the data of Table III.

From Table III it will be noted that the uranium extraction coefficients resulting from the use of the ammonium salt form of extracting reagent were considerably lower, by a factor of 4 to 5, than the coefficients resulting from the use of the acid form of the reagent. This is attributed to the effect of pH as described above and shown in the figure. It indicates that when ammonium carbonate is the stripping agent the extraction system should be protected from excessive increase of pH due to extractant recycle. This may be accomplished, e.g., by providing extra stages in the extraction system so that uranium extraction is complete before the aqueous stream encounters unequilibrated recycled extractant, or by converting part or all of the extractant before recycle to its free acid form by treatment with aqueous acid solution.

Example II

The following example provides further teaching to illustrate the dependence of the uranium extraction coefficient on the amount of free fluoride in the uranium solvent extraction feed solution and illustrates the high overall uranium to zirconium decontamination factor which may be achieved by practicing this invention. A flow sheet was set up on the basis of the previous results. Extraction with a single volume of extractant from successive volumes of feed was used as an approximation to a countercurrent extraction step. Two tests were run with D2EHPA-TOPO and Z feed in one case, and with D2EHPA-DAAP and diluted Z feed in another.

In the D2EHPA-TOPO test 10 ml. of 0.1 M D2EHPA-0.05 M TOPO in Amsco-125–82 was contacted with 5 successive 20 ml. volumes of Z feed, with two successive volumes of 0.1 M $NH_4HF_2$ scrub, and with three successive 2 ml. volumes of 5% ammonium carbonate (0.63 M $NH_3$, 0.52 M $CO_2$). The estimated free fluoride concentration was 0.7 M in the feed. The uranium extraction coefficient averaged ~2. In the scrubs, $E_a^o(U)$ averaged ~50. The successive strip solutions contained

| Strip | G. U/liter | G. Zr/liter |
|---|---|---|
| 1st | ~3 | ~0.01 |
| 2d | 0.8 | 0.005 |
| 3d | 0.03 | 0.001 |

The stripped organic contained $4 \times 10^{-5}$ g. U/liter. The U/Zr decontamination factor was ~$10^4$.

In the D2EHPA-DAAP test, 10 ml. of 0.3 M D2EHPA-0.15 DAAP in Amsco-125–82 was contacted with five successive volumes of 20 ml. Z feed+20 ml. water, and then with three successive 5 ml. volumes of 5% ammonium carbonate. The scrub step was omitted to simplify handling and analyses. The estimated free fluoride concentration was 0.35 M in the feed. The uranium extraction coefficient averaged ~20, and the uranium loading reached 5.3 g. U/liter (<0.1 g. Zr/liter). The successive strip solutions contained

| Step | G. U/liter | G. Zr/liter |
|---|---|---|
| 1st | 12 | ~0.1 |
| 2d | 0.12 | |
| 3d | 0.004 | |

The stripped organic contained 0.007 g. U/liter. The U/Zr decontamination factor from feed to the first strip solution was $4 \times 10^3$.

In view of the preceding description, it is apparent that this invention overcomes limitations and disadvantages of previously known processes for treating uranium and/or zirconium containing aqueous fluoride solutions for the purposes of recovering uranium and/or zirconium therefrom. The advantages of this invention are ever more apparent when the solutions being treated are derived from neutron-irradiated compositions since the conditions stipulated for efficient uranium and/or zirconium recovery are relatively non-corrosive and do not require the presence of either a fluoride complexing agent or a salting out reagent.

Having thus described my invention, I claim:

1. A process for the recovery of uranium values from an aqueous fluoride solution containing said values which comprises:
   (a) adjusting the free fluoride concentration of said solution to no more than about 1 M $F^-$;
   (b) contacting said solution with an organic mixture comprised of a substantially water-immiscible diluent, a dialkylphosphoric acid having the formula

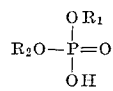

where $R_1$ and $R_2$ represent alkyl radicals, the total number of carbon atoms in said dialkylphosphoric acid being at least ten, and a neutral organophosphorus compound selected from the group consisting of

and

where $R_3$, $R_4$ and $R_5$ are selected from the group consisting of alkyl and alkoxy radicals, and alkyl and alkoxy radicals having at least one substituent selected from the group consisting of hydroxyl and chloro, and $R_6$, $R_7$ and $R_8$ represent alkoxy radicals, the total number of carbon atoms in said neutral organophosphorus compound being at least ten, whereby uranium values are transferred to the organic phase;

(c) and separating the resultant uranium enriched organic phase from the contacted aqueous phase.

2. The process according to claim 1 wherein the pH of the aqueous phase is no greater than about 7.

3. The process according to claim 1 wherein the uranium-rich organic phase is scrubbed with a dilute aqueous solution selected from ammonium fluoride and ammonium bifluoride.

4. In a process for separating uranium from zirconium-uranium nuclear fuel composition in which said composition is dissolved in an aqueous fluoride solution containing free fluoride ions, the improvement which comprises:

(a) adjusting the free fluoride concentration of said solution to no more than about 1 M $F^-$;

(b) contacting said solution with an organic mixture comprised of a substantially water-immiscible diluent, a dialkylphosphoric acid having the formula

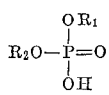

where $R_1$ and $R_2$ represent alkyl radicals, the total number of carbon atoms in said dialkylphosphoric acid being at least ten, and a neutral organophosphorus compound selected from the group consisting of

and

where $R_3$, $R_4$ and $R_5$ are selected from the group consisting of alkyl and alkoxy radicals, and alkyl and alkoxy radicals having at least one substituent selected from the group consisting of hydroxyl and chloro, and $R_6$, $R_7$ and $R_8$ represent alkoxy radicals, the total number of carbon atoms in said neutral organophosphorus compound being at least ten whereby uranium values are transferred to the organic phase;

(c) and separating the resultant uranium enriched organic phase from the contacted aqueous phase.

5. The process according to claim 4 wherein the uranium-rich organic phase is scrubbed with a dilute aquous solution selected from ammonium fluoride and ammonium bifluoride.

6. The process according to claim 4 wherein the zirconium values in the resulting aqueous raffinate are recovered as fluozirconate.

7. The process according to claim 4 wherein the zirconium values in the resulting aqueous raffinate are recovered as an oxide.

8. The process according to claim 4 wherein the pH of the aqueous phase is no greater than about 7.

References Cited by the Examiner
UNITED STATES PATENTS

| | | | |
|---|---|---|---|
| 2,859,094 | 11/1958 | Schmitt et al. | 23—14.5 |
| 2,992,886 | 7/1961 | Gens | 23—14.5 |

LEON D. ROSDOL, *Primary Examiner.*

S. TRAUB, *Assistant Examiner.*